(12) United States Patent
Masuda et al.

(10) Patent No.: US 11,762,562 B2
(45) Date of Patent: Sep. 19, 2023

(54) PERFORMANCE ANALYSIS APPARATUS AND PERFORMANCE ANALYSIS METHOD

(71) Applicant: Hitachi, Ltd., Tokyo (JP)

(72) Inventors: Mineyoshi Masuda, Tokyo (JP); Yosuke Himura, Tokyo (JP); Kouichi Murayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 429 days.

(21) Appl. No.: 17/194,538

(22) Filed: Mar. 8, 2021

(65) Prior Publication Data

US 2021/0365189 A1 Nov. 25, 2021

(30) Foreign Application Priority Data

May 25, 2020 (JP) .................................. 2020-090456

(51) Int. Cl.
*G06F 3/06* (2006.01)
*G06N 5/04* (2023.01)
*G06F 11/34* (2006.01)
*G06Q 10/04* (2023.01)

(52) U.S. Cl.
CPC .......... *G06F 3/0613* (2013.01); *G06F 3/0635* (2013.01); *G06F 3/0673* (2013.01); *G06F 11/3409* (2013.01); *G06N 5/04* (2013.01); *G06Q 10/04* (2013.01)

(58) Field of Classification Search
CPC .... G06F 3/0613; G06F 3/0635; G06F 3/0673; G06F 11/3409; G06F 3/0653; G06F 11/3419; G06F 11/3447; G06N 5/04; G06N 20/00; G06Q 10/04
See application file for complete search history.

(56) References Cited

U.S. PATENT DOCUMENTS 6,745,150 B1 6/2004 Breiman
2017/0169358 A1* 6/2017 Choi ...................... G06N 20/00

* cited by examiner

*Primary Examiner* — Tasnima Matin
(74) *Attorney, Agent, or Firm* — BAKER BOTTS L.L.P.

(57) ABSTRACT

The present invention aims to specify a bottlenecked resource more accurately in an IT system.
In a performance analysis apparatus which includes a processing device, a storage device and an input/output interface and analyzes a performance of an IT system, the processing device creates an overall performance prediction model by using a nonlinear regression algorithm with a first overall performance value being set as an objective variable and with a first resource performance value being set as an explanatory variable, creates an explanatory model by inputting the overall performance prediction model and using an XAI technology and calculates a degree of per-resource influence on the overall performance value which is output by inputting a second resource performance value into the explanatory model.

12 Claims, 12 Drawing Sheets

FIG.3

| MEASUREMENT TIME | SYSTEM NAME | RESPONSE TIME | HOST X | HOST Y | | | |
|---|---|---|---|---|---|---|---|
| | | | CPU USAGE RATE | CPU USAGE RATE | CACHE HIT RATE | DISK IOPS | |
| T0 | SYSTEM A | 20 ms | 10% | 30% | 99% | 200 | 3000 |
| T1 | | 25 ms | 15% | 25% | 98% | 300 | 3001 |
| ⋮ | ⋮ | ⋮ | ⋮ | ⋮ | ⋮ | ⋮ | |
| T10 | | 30 ms | 30% | 20% | 99.5% | 250 | 3010 |
| T11 | SYSTEM A | 35 ms | 10% | 15% | 98.5% | 100 | 3011 |
| T12 | | 15 ms | 5% | 10% | 99.5% | 50 | 3012 |
| ⋮ | ⋮ | ⋮ | ⋮ | ⋮ | ⋮ | ⋮ | |

| MEASUREMENT TIME | SYSTEM NAME | READ RESPONSE TIME | WRITE RESPONSE TIME | STORAGE 1 | | | | |
|---|---|---|---|---|---|---|---|---|
| | | | | PROCESSOR USAGE RATE | CACHE HIT RATE | DISK BUSY RATE | ... | |
| T0 | STORAGE SYSTEM B | 1.5 ms | 0.5 ms | 30% | 99% | 10% | ... | 3020 |
| T1 | | 1.3 ms | 0.4 ms | 35% | 99.5% | 5% | ... | 3021 |
| ⋮ | ⋮ | ⋮ | ⋮ | ⋮ | ⋮ | ⋮ | ⋮ | |
| T10 | STORAGE SYSTEM B | 2.0 ms | 0.5 ms | 40% | 98.5% | 15% | ... | 3022 |
| ⋮ | ⋮ | ⋮ | ⋮ | ⋮ | ⋮ | ⋮ | ⋮ | |

FIG.4

| SYSTEM NAME | MODEL TYPE | CREATION TIME | MODEL DATA | |
|---|---|---|---|---|
| SYSTEM A | RESPONSE TIME MODEL | T2 | (BINARY DATA) | 4000 |
| | RESPONSE TIME EXPLANATORY MODEL | T2 | (BINARY DATA) | 4001 |
| STORAGE SYSTEM B | READ RESPONSE TIME MODEL | T3 | (BINARY DATA) | 4002 |
| | READ RESPONSE TIME EXPLANATORY MODEL | T3 | (BINARY DATA) | 4003 |
| | WRITE RESPONSE TIME MODEL | T3 | (BINARY DATA) | 4004 |
| | WRITE RESPONSE TIME EXPLANATORY MODEL | T3 | (BINARY DATA) | 4005 |
| ⋮ | ⋮ | ⋮ | ⋮ | |

FIG.5

| MEASUREMENT TIME | SYSTEM NAME | RESPONSE TIME | ABNORMAL VALUE FLAG | RESPONSE TIME PREDICTIVE VALUE | ACCURACY | HOST X | | HOST Y | | |
|---|---|---|---|---|---|---|---|---|---|---|
| | | | | | | CPU USAGE RATE | CPU USAGE RATE | CACHE HIT RATE | DISK IOPS | |
| ⋮ | ⋮ | ⋮ | ⋮ | ⋮ | ⋮ | ⋮ | ⋮ | ⋮ | ⋮ | |
| T10 | | 30 ms | Y | 28 ms | 0.9 | 10 ms | 5 ms | 5 ms | 8 ms | 5000 |
| T11 | SYSTEM A | 35 ms | Y | 18 ms | 0.5 | 8 ms | 3 ms | 3 ms | 4 ms | 5001 |
| T12 | | 15 ms | N | 15 ms | 1.0 | 5 ms | 3 ms | 2 ms | 5 ms | 5002 |
| ⋮ | ⋮ | ⋮ | ⋮ | ⋮ | ⋮ | ⋮ | ⋮ | ⋮ | ⋮ | |

| SYSTEM NAME | PERIOD | PERFORMANCE VALUE NAME | BOTTLENECKING FREQUENCY |
|---|---|---|---|
| SYSTEM A | T10 – T20 | CPU USAGE RATE@HOST X | 1 |
| ⋮ | ⋮ | ⋮ | ⋮ |

FIG.12

| HOST X | HOST Y | | |
|---|---|---|---|
| 701 | 702 | 703 | 704 |
| CPU USAGE RATE | CPU USAGE RATE | CACHE HIT RATE | DISK IOPS |
| 4 ms | −1 ms | −1 ms | 0 ms |

| SYSTEM NAME (401) | MODEL TYPE (402) | CREATION TIME (403) | MODEL DATA (404) | USE (405) | |
|---|---|---|---|---|---|
| SYSTEM A | RESPONSE TIME MODEL | T2 | (BINARY DATA) | N | 4000 |
| | RESPONSE TIME EXPLANATORY MODEL | T2 | (BINARY DATA) | N | 4001 |
| | RESPONSE TIME LINEAR MODEL | T2 | (BINARY DATA) | Y | 4006 |
| STORAGE SYSTEM B | READ RESPONSE TIME MODEL | T3 | (BINARY DATA) | Y | 4002 |
| | READ RESPONSE TIME EXPLANATORY MODEL | T3 | (BINARY DATA) | Y | 4003 |
| | READ RESPONSE TIME LINEAR MODEL | T3 | (BINARY DATA) | N | 4007 |
| | WRITE RESPONSE TIME MODEL | T3 | (BINARY DATA) | Y | 4004 |
| | WRITE RESPONSE TIME EXPLANATORY MODEL | T3 | (BINARY DATA) | Y | 4005 |
| | WRITE RESPONSE TIME LINEAR MODEL | T3 | (BINARY DATA) | N | 4008 |
| ⋮ | ⋮ | ⋮ | ⋮ | | |

PERFORMANCE ANALYSIS APPARATUS AND PERFORMANCE ANALYSIS METHOD

BACKGROUND

The present invention relates to a performance analysis method and a performance analysis method for use in a performance analysis of an IT system which is one of operation management tasks of the IT system.

As one method of measuring whether the overall performance of the IT system is high or low, there is a method of measuring and analyzing a response time of the IT system. The response time is a time which is taken from when the IT system receives a request for execution of a process concerned from the outside to when the IT system returns a response to the outside. In a case where the response time of the IT system is long, it means that the performance of the IT system is low. In a case where the response time is short, it means that the performance of the IT system is high. As another method of measuring the overall performance of the IT system, there is a method of measuring the number of requests which are left as they are or the time for which a person in charge is in a kept-waiting state due to the lack of the performance of the IT system.

In general, the IT system is configured by a plurality of resources. The resource means a computational source of a computer which configures the IT system such as, for example, a CUP (Central Processing Unit), a memory and so forth. It is thought that the response time of the IT system is a total time which is taken for execution of the requested process in each resource. In the present invention, the time which is taken for execution of the requested process in each resource is referred to as a "per-resource breakdown time".

It is possible to specify a bottlenecked resource of the IT system from the per-resource breakdown time. The bottlenecked resource means a resource which is large in a degree of influence which induces deterioration of the overall performance of the IT system. Generation of the bottlenecked resource induces an increase in the time which is taken for processing the request in the resource concerned and thereby the response time is increased. Therefore, the bottlenecked resource is the resource which is the longest in the per-resource breakdown time or the resource the per-resource breakdown time of which becomes the longest in comparison with a general value.

In a case where the per-resource breakdown time is found in this way, the bottlenecked resource is specified. However, the per-resource breakdown time is not measured in all the IT systems. In a case where the CPU is given by way of example, although monitoring of a usage rate of the CPU and monitoring of the response time are performed in most IT systems, it is rare to measure the time that the CPU takes for execution of the requested process, that is, the per-resource breakdown time. It is thought that the reason therefor lies in the point that a processing burden on measurement of the per-resource breakdown time and a cost involved for saving the measurement data are large.

As a matter of fact, a correlation is established between the CPU usage rate and the response time and an increase in the CPU usage rate leads to an increase in the response time. However, for example, in a case where the CPU usage rate is 80%, what percentage the breakdown time that the CPU takes for processing the request occupies in the response time, whether the percentage of the breakdown time of the CPU is higher than those of other resources and so forth are unknown. Such a problem is derived from the above-mentioned points that the per-resource breakdown time is not found from performance value data of the resource such as the CPU usage rate and so forth and it is difficult to specify the bottlenecked resource from within several resources.

One method of solving this problem is disclosed in U.S. Pat. No. 6,745,150. In U.S. Pat. No. 6,745,150, it is disclosed that a relation between the response time and a performance value of each resource is modeled in a linear form by a multiple regression analysis. That is, the linear form that the response time is set as an objective variable and the performance value of each resource is set as an explanatory variable is derived from past measured performance data and the response time is modeled as a total sum of values which are obtained by multiplying the performance value of the resource by a derived coefficient. Here, it is thought that the value which is obtained by multiplying the performance value of the resource by the derived coefficient indicates the per-resource breakdown time of the resource concerned.

SUMMARY

The solving method which is disclosed in U.S. Pat. No. 6,745,150 is one method of estimating the per-resource breakdown time from the performance value of the resource. This method is based on the assumption that the linear relation is established between the response time of the IT system and the performance value of each resource. However, in reality, there are many cases where the relation between the performance value of each resource and the response time of the IT system is nonlinear. Accordingly, it is impossible to model the response time of the IT system sufficiently accurately by the method which is disclosed in U.S. Pat. No. 6,745,150 and also the per-resource breakdown time which is derived from the model of the response time reaches a numerical value which is quite different from a real value and there is a fear that the bottlenecked resource may be erroneously specified. As a result of erroneous specification of the bottlenecked resource, even in a case where the resource concerned is reinforced, the response time is not improved and an economical loss is given to the owner of the IT system.

In view of the above-described problem, the present invention aims to provide a performance analysis apparatus and a performance analysis method which make it possible to accurately specify the bottlenecked resource by providing a highly accurate estimated value of the per-resource breakdown time.

According to one aspect of the present invention, there is provided a performance analysis apparatus for use in a performance analysis of an IT system which includes a processing device, a storage device, and an input/output interface, in which the processing device creates an overall performance prediction model by using a nonlinear regression algorithm with a first overall performance value which is input via the input/output interface and which is measured from the IT system being set as an objective variable and with a first resource performance value which is measured simultaneously with measurement of the first overall performance value and which is a value of a resource which configures the IT system being set as an explanatory variable, creates an explanatory model by inputting the overall performance prediction model and using an XAI (Explainable Artificial Intelligence) technology and calculates a degree of per-resource influence on the overall performance value which is output by inputting a second resource performance value which is measured at a time which is different from the time that the first resource performance value of the resource is measured into the explanatory model.

According to the present invention, it becomes possible to more accurately specify the bottlenecked resource.

BRIEF DESCRIPTION OF THE DRAWINGS

FIG. 3 is a diagram illustrating one configuration example of a performance value data table in the first embodiment of the present invention.

FIG. 4 is a diagram illustrating one configuration example of a model table in the first embodiment of the present invention.

FIG. 5 is a diagram illustrating one configuration example of a per-resource breakdown table in the first embodiment of the present invention.

FIG. 12 is a diagram illustrating another example of output values of explanatory models in the first embodiment of the present invention.

FIG. 13 is a diagram illustrating one configuration example of a model table in a second embodiment of the present invention.

DETAILED DESCRIPTION

In the following, embodiments of the present invention will be described in detail using the drawings.

First Embodiment

In the first embodiment, algorithms for generating a nonlinear model which is higher than a linear model in expressive power such as, for example, a random forest regression algorithm, a support vector regression algorithm and so forth are used for modeling a response time. Further, an explanatory model is generated from a response time model by using an XAI (eXplainable AI) in order to calculate a degree of influence of a performance value of a resource which is an explanatory variable of a response time model on the response time. A performance value of each resource is given as an input into the explanatory model so as to make the explanatory model output a numerical value which becomes the basis of a per-resource breakdown time.

Further, an accuracy for a value of the response time breakdown is given to the response time model on the basis of a difference between a predicted value of the response time which is output by inputting the performance value of the resource into the response time model and a response time which is actually measured. Then, response time breakdown values which are high in accuracy are totalized thereby to specify one resource which is frequently detected as the bottlenecked resource in a certain period.

It becomes possible to model the response time with a higher accuracy by using the algorithm which is high in modelling ability and it becomes possible to calculate the per-resource breakdown time similarly to the case of using the linear model by using the explanatory model. In addition, the accuracy is further given to the per-resource breakdown time so as to exclude a per-resource breakdown time which is low in accuracy and thereby it becomes possible to perform specification of the bottlenecked resource which is accurate statistically.

Figure 1:
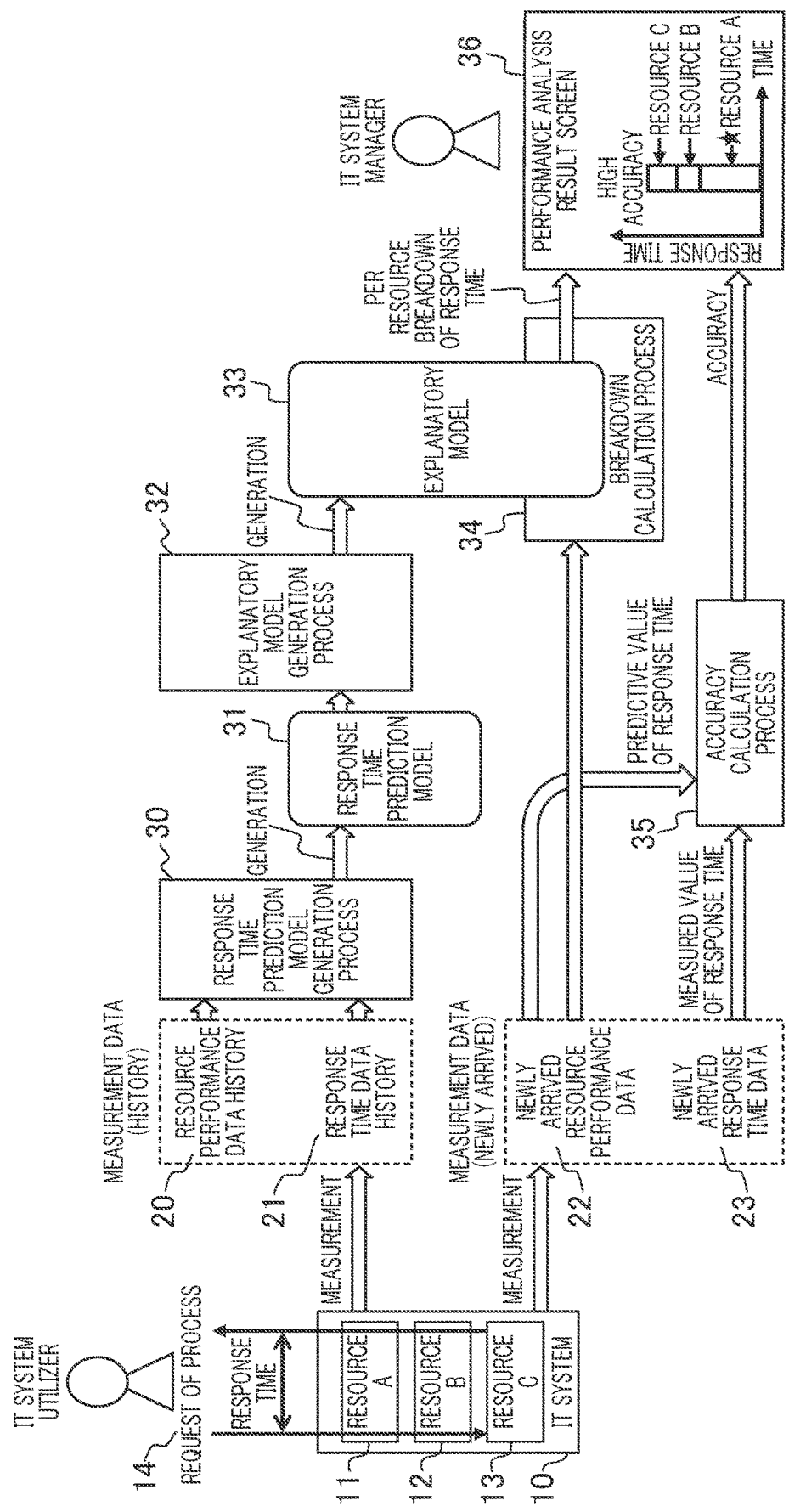
FIG. 1 is a diagram illustrating one example of an outline of processes for bottlenecked resource specification in a first embodiment of the present invention.

FIG. 1 is a diagram illustrating one example of an outline of processes for bottlenecked resource specification in the first embodiment. In FIG. 1, a state where the processes proceed from the left side toward the right side is illustrated.

In FIG. 1, an IT system 10 which is a target for analysis processing is configured by a plurality of resources, that is, a resource A 11 to a resource C 13. The IT system 10 receives a process request (a request for execution of a process concerned) 14 from an IT system utilizer, executes the requested process by using a resource concerned and sends a result of execution of the process back to the IT system utilizer. A time taken from when the IT system 10 receives the process request 14 to when the IT system 10 sends the result back to the IT system utilizer is the response time.

A process flow which is indicated by hollow arrows on an upper part in FIG. 1 includes processes of generating a response time prediction model 31 and an explanatory model 33 from measurement data on the IT system 10. The measurement data which is obtained by measuring the IT system 10 is stored as measurement data (history). The measurement data (history) includes a resource performance data history 20 which is a performance value of each resource which configures the IT system 10 and a response time data history 21 which is obtained by measuring the response time of the IT system 10.

The response time prediction model generation process 30 is the process of generating the response time prediction model 31. That is, the response time prediction model 31 is generated by using an algorithm for making it possible to model a nonlinear relation such as a random forest regression and so forth with the resource performance data history 20 being set as an explanatory variable and with the response time data history 21 which is obtained simultaneously with the resource performance data history 20 being set as an objective variable.

An explanatory model generation process 32 is a process of generating the explanatory model 33 which corresponds to the response time prediction model 31 by inputting the response time prediction model 31 and using the XAI technology.

A breakdown calculation process 34 is a process of calculating a per-resource response time breakdown by inputting newly arrived measurement data into the explanatory model 33. First, the measurement data (newly arrived) is obtained by newly measuring the performance of the IT system 10. The measurement data (newly arrived) includes newly arrived resource performance data 22 which is data on the performance value of each resource and newly arrived response time data 23 similarly to the above-described measurement data (history). Data which becomes the basis of the per-resource response time breakdown is calculated by inputting the newly arrived resource performance data 22 into the explanatory model 33.

Further, an accuracy calculation process 35 is a process of measuring the accuracy of the calculated per resource response time breakdown. First, the newly arrived resource performance data 22 in the measurement data (newly arrived) is input into the response time prediction model 31 and thereby the predicted value of the response time is obtained. Then, a predicted-actual difference between the predicted value of the response time and the newly arrived response time data 23 which is a measured value of the response time is calculated. In a case where the predicted-actual difference is small, it is thought that it is possible to accurately model the response time and therefore a high accuracy is output. In contrast, in a case where the predicted-actual difference is large, a low accuracy is output.

Up to this time point, it is possible to obtain a result of analysis of the measurement data (newly arrived) which is obtained at a certain time, that is, the per-resource response time breakdown and the accuracy thereof. A performance analysis result screen 36 is a screen image for informing a manager of the IT system of the result of analysis. A graph that the horizontal axis indicates the time and the vertical axis indicates the response time is displayed on an imaginative diagram and the per-resource response time breakdown which is obtained at a certain time is displayed in the form of a cumulative bar graph. As apparent from the drawing, since the response time breakdown of the resource A is the largest and therefore the possibility that the resource A is the bottlenecked resource at this time is the highest, an asterisk is marked in front of the resource name so as to indicate the highest possibility to the manager of the IT system.

In addition, although not illustrated in the drawing, the frequency that the resource is the most involved in an increase in response time in a certain period is totalized and thereby it becomes possible to indicate the resource which is the highest in the possibility that the resource is the bottlenecked resource in that period to the IT system manager. At this time, the frequency is totalized by excluding a result of analysis which is low in accuracy so as to avoid intrusion of an uncertain analysis result and to accurately specify the bottlenecked resource. In addition, it is also possible to specify the bottlenecked resource which is the most involved in occurrence of a spiking phenomenon by limiting the time to be included as a target time for totalization to the time that the response time exhibits the spiking phenomenon, that is, the time that the response time indicates an abnormal value which is larger than values of the surroundings.

Figure 2:
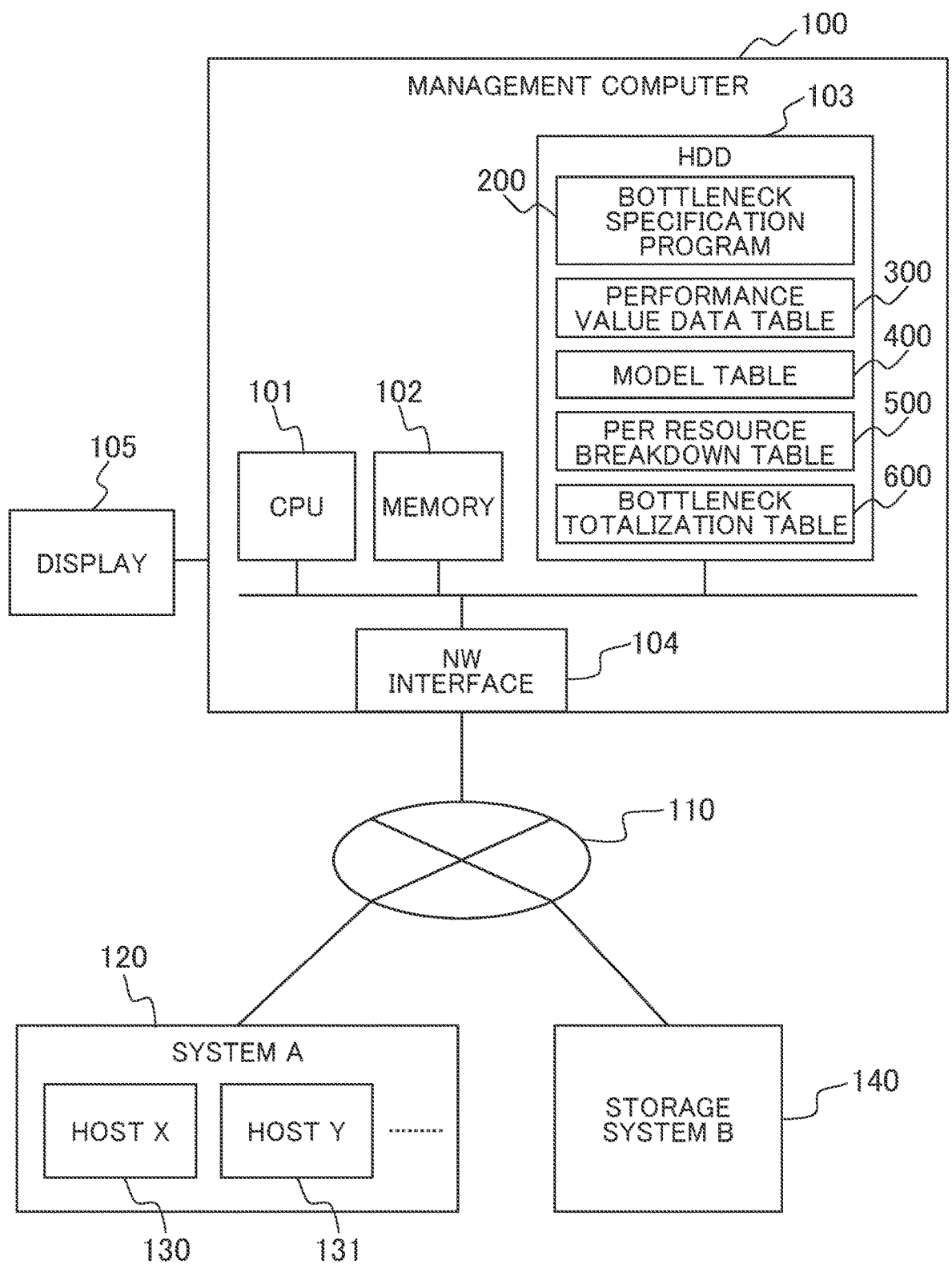
FIG. 2 is a diagram illustrating one configuration example of a performance analysis system in the first embodiment of the present invention.

FIG. 2 is a diagram illustrating one configuration example of a performance analysis system in the first embodiment. In FIG. 2, a management computer 100 is a computer that a bottleneck specification program 200 in the first embodiment operates and functions as a performance analysis apparatus. The management computer 100 is connected with a system A 120, that is, the IT system which is a performance analysis target and a storage system B 140 which is also the performance analysis target via a LAN (Local Area Network) 110.

The management computer 100 includes a CPU (a processing device) 101, a memory (a storage (device) 102, a network (NW) (input/output) interface 104, an HDD (Hard Disk Drive) 103 which stores persistent data and a display 105. The bottleneck specification program 200, a performance value data table 300, a model table 400, a per-resource breakdown table 500 and a bottleneck totalization table 600 are stored in the HDD 103. The bottleneck specification program 200 is loaded from the HDD 103 to the memory 102 and is executed on the CPU 101.

The system A 120 and the storage system B 140 are targets performances of which are measured and analyzed by the management computer 100. The system A 120 is configured by a plurality of computers (a host X 130 and a host Y 131 are illustrated in FIG. 1) and software (not illustrated) such an OS and so forth which operate on the hosts X 130 and Y 131. The hosts X 130 and Y 131 are computers which include constitutional elements which are the same as those of the management computer 100.

In the first embodiment, although the management computer 100, and the system A 120 and the storage system B 140 which are the analysis targets are connected to the same network, the management computer 100 may be also connected to a network which is different from the network for the analysis targets. For example, the management computer 100 may be configured to run on clouds such that functions that the management computer 100 has are provided as cloud services and the performance data on the system A 120 and the storage system B 140 which are the analysis targets is sent to the cloud services via the Internet. In this configuration, it becomes possible for the IT system manager to gain access to the management computer 100 which runs on the cloud by using, for example, a browser and to confirm a result of analysis from anywhere.

FIG. 3 is a diagram illustrating one configuration example of the performance value data table 300 in the first embodiment. In FIG. 3, the performance value data which is obtained by measuring the system A 120 and the storage system B 140 which are the analysis targets is stored in the performance value data table 300. Any method may be used for measurement of the performance values. For example, a method that the management computer 100 periodically collects the performance value data such as the CPU usage rate and so forth of the host X 130 that a measurement agent (not illustrated) which operates on the host X 130 and the host Y 131 measures may be used and an agentless-system method that the management computer 100 directly collects the performance value data that the OS and so forth of the host X 130 measure without using the agent may be used.

In FIG. 3, an upper table is the performance value data table 300 which is obtained in a case where the performance values of the system A 120 are stored. In the performance value data table 300, respective pieces of the performance value data on the system A 120 which are measured at a certain time are stored row by row. The respective rows in the performance value data table 300 represent a measurement time 301 of the performance value data, a system name 302 which is the target and a response time 303 which indicates the system performance of the target system. In addition, other respective rows represent performance values (304 to 307) which are measured values of the two hosts (the host X 130 and the host Y 131) which configure the system A 120. In FIG. 3, columns 3000, 3001, 3010, 3011 and 3012 represent measurement data which are obtained at measurement times T0, T1, T10, T11 and T12.

In FIG. 3, a lower table is the performance value data table 300 which is obtained in a case where the performance values of the storage system B 140 are stored. Although the configuration of this performance value data table 300 is almost the same as the configuration of the table for the system A 120, the lower table is different from the upper table in the point that I/O response times (READ response time 308 and WRITE response time 309) of I/O requests for READ and WRITE in the storage system B 140 are stored in place of a response time 303 and the performance value data which is stored is performance value data (processor usage rate 310, cache hit rate 311, disk busy rate 312 and so forth) on resources in the storage system B 140.

FIG. 4 is a diagram illustrating one configuration example of the model table 400 in the first embodiment. In FIG. 4, the model table 400 is a table which stores various pieces of model data which are generated in the course of execution of the analysis processing. In the model table 400, every row is prepared for every model which is generated. The model table 400 is configured by respective rows which represent a system name 401 which is the basis of each model, a model type 402 of each model, a creation time 403 of each model and a model Data 404.

In FIG. 4, model data for the system A 120 are stored in columns 4000 and 4001. In the column 4000, the model type 402 is a "response time model". The "response time model" indicates that the model data in the column concerned is data on the model which indicates a relation between one resource which configures the system A 120 and the response time of the system A 120. In the column 4001, the model type 402 is a "response time explanatory model". The "response time explanatory model" indicates that the model data in the column concerned is a model which is generated for explaining the response time model which is stored in the column 4000. The model data is created in the form that the response time model is paired with the explanatory model thereof in this way. Incidentally, in many cases, these pieces of model data are binary data.

Model data for the storage system B 140 is stored in columns 4002 and 4003 in FIG. 4. A READ I/O request response time model of the storage system B 140 is stored in the column 4002. One explanatory model which is paired with this response time model is stored in the column 4003. WRITE I/O request response time model and explanatory model of the storage system B 140 are stored in columns 4004 and 4005.

FIG. 5 is a diagram illustrating one configuration example of the per-resource breakdown table 500 in the first embodiment. In FIG. 5, the per-resource breakdown table 500 is a table which stores a response time estimated value in the per-resource breakdown time. In the per-resource breakdown table 500, per-resource response time estimated values of the target system which are obtained at certain times are stored column by column. Incidentally, in FIG. 5, the per-resource breakdown table 500 which is obtained in a case where the system A 120 is set as the target is indicated.

In FIG. 5, a measurement time 501, a system name 502, a response time 503, an abnormal value flag 504, a response time predicted value 505, an accuracy 506 and values of the per-resource breakdown time (CPU usage rate 507 of the host X, CPU usage rate 508 of the host Y, cache hit rate 509 and disk IOPS (input output per sound) 510) of the target system are stored in respective rows of the per-resource breakdown table 500. Data which are the same as the data on the measurement time 301, the system name 302 and the response time 303 in the performance value data table 300 in FIG. 3 are stored in the measurement time 501, the system name 502 and the response time 503 respectively. As the values of the per-resource breakdown time, per resource breakdown response time estimated values which are calculated from the respective resource performance values (304 to 307) which are stored in the performance value data table 300 are stored. The resource which is the most increased in the response time, that is, the bottlenecked resource is found by mutually comparing numerical values which are stored in the rows 507 to 510 horizontally. A method of calculating the data to be stored into the table 500 and a way of using the stored values will be described later.

Figures 6, 7:
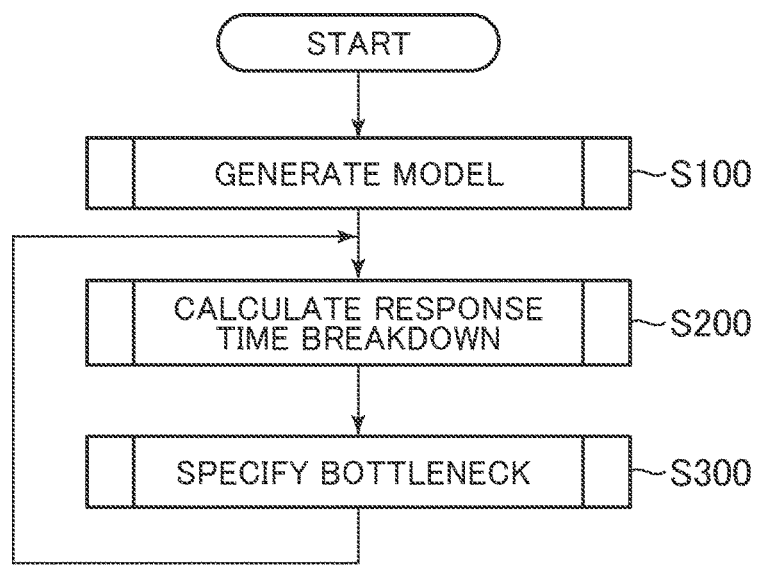
FIG. 6 is a diagram illustrating one configuration example of a bottleneck totalization table in the first embodiment of the present invention.
FIG. 7 is a process flowchart illustrating one example of analysis processing in the first embodiment of the present invention.

FIG. 6 is a diagram illustrating one configuration example of the bottleneck totalization table 600 in the first embodiment. In FIG. 6, the bottleneck totalization table 600 is a table which stores the resource which is bottlenecked in a certain period and the frequency that the resource is bottlenecked. Respective rows of the bottleneck totalization table 600 are configured by a system name 601, a period 602, a performance value name 603 and a bottlenecking frequency 604. A name of the analysis target system is stored in the system name 601. An analysis target period is stored in the period 602. The name of a resource which is decided as a bottlenecked resource in a designated period (for example, a CPU usage rate of the host X) is stored in the performance value name 603 and the frequency that the resource is decided to be bottlenecked in the designated period is stored in the bottlenecking frequency 604. A method of calculating the data which is stored in the table 600 and a way of using the stored values will be described later.

In the following, flows of several processes in the first embodiment will be described.

FIG. 7 illustrates is a process flowchart illustrating one example of performance analysis processing which is main processing in the first embodiment. The bottleneck specification program 200 works so as to execute this processing.

In FIG. 7, in S100, the bottleneck specification program 200 works so as to generate a model which is used for analysis. This process corresponds to the response time prediction model generation process 30 and the explanatory model generation process 32 in the schematic diagram in FIG. 1.

Next, in S200, the bottleneck specification program 200 works so as to perform estimated calculation of the response time breakdown of the specification target system on newly arrived performance data. This process corresponds to the breakdown calculation process 34 and the accuracy calculation process 35 in FIG. 1.

Next, in S300, the bottleneck specification program 200 works so as to perform a bottleneck specification process. This process corresponds to the process of specifying the bottlenecked resource (in FIG. 1, marking the resource name with the asterisk) which is displayed on the performance analysis result screen 36 in FIG. 1. Thereafter, execution of the processes in S200 and S300 are repeated by using the model which is generated in S100 every time the newly arrived performance data is measured.

In the following, details of respective processes will be described.

Figure 8:
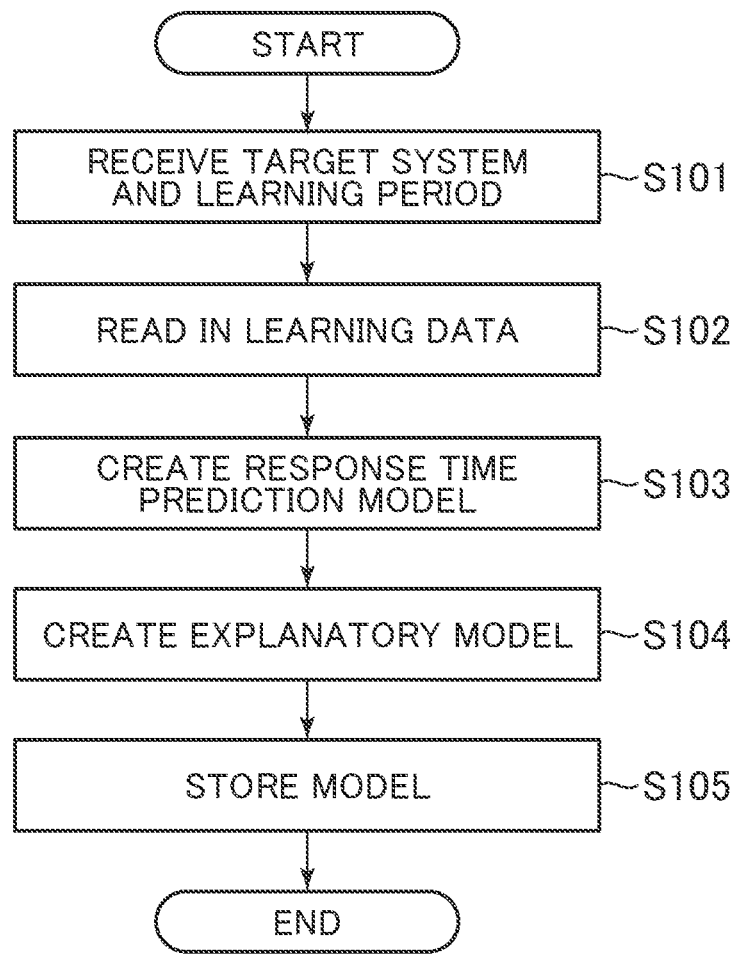
FIG. 8 is a process flowchart illustrating one example of a model generation process in the first embodiment of the present invention.

FIG. 8 is a process flowchart illustrating one example of the model generation process (S100) in the first embodiment. In FIG. 8, the bottleneck specification program 200 works so as to execute all the steps.

Figure 11:
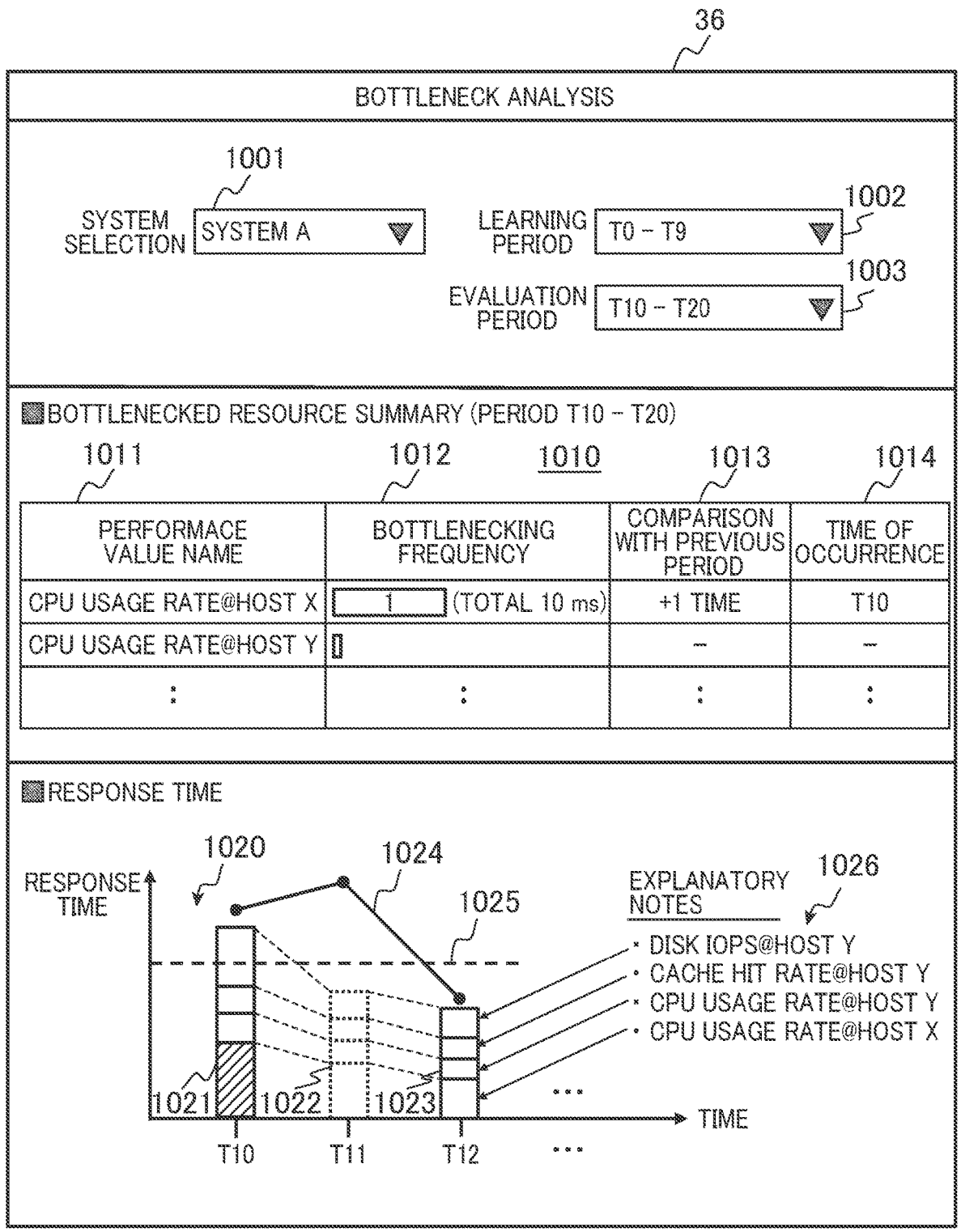
FIG. 11 is a diagram illustrating one screen example showing a result of execution of the bottleneck specification process in the first embodiment of the present invention.

In FIG. 8, in S101, the bottleneck specification program 200 works so as to receive the analysis target system and the period which is used for learning. The analysis target system and the period are designated by a GUI (Graphical User Interface) which is illustrated in FIG. 11 (will be described later).

Next, in S102, the bottleneck specification program 200 works so as to read in learning data out of the performance value data table 300 which is illustrated in FIG. 3. The bottleneck specification program 200 works so as to read data in the rows that the system name which is received in S101 matches the system name 302 and the time which is stored in the measurement time 301 is included in the received learning period. The rows include System Response time 303 and the performance values (304 to 307) of each resource of the system concerned respectively.

Next, in S103, the bottleneck specification program 200 works so as to create the response time prediction model for the specified system by using the performance value data which is read in S102 as the learning data. The response time prediction model is a regression model that the performance values (304 to 307) of each resource of the system are set as explanatory variables and Response Time 303 of the system is set as the objective variable. Any repression algorithm may be used as a mechanical learning algorithm for generating the regression model. For example, either a random forest regression algorithm or a support vector regression algorithm may be used.

Next, in S104, the bottleneck specification program 200 works so as to generate the explanatory model from the response time prediction model which is created in S103. Then, the bottleneck specification program 200 works so as to input the response time prediction model into a program which implements the XAI technology and to obtain the explanatory model as an output. The explanatory model is a model which explains a relation between per-resource performance value data which is the explanatory variable of the response time prediction model and the system response time which is the objective variable. Although SHAP (SHapley Additive exPlanations) is given as a representative example of the XAI technology to be utilized, any another XAI technology may be utilized.

Then, in S105, the bottleneck specification program 200 works so as to store data on the response time model and data on the explanatory model thereof which are generated in S103 and S104 into the model table 400. For example, in a case of the response time model for the system A, the bottleneck specification program 200 works so as to create model data to be stored into the column 4000 of the model table (FIG. 4) by setting the system name 401 to "System A" and setting the model type 402 to the "response time model". Likewise, in a case of the explanatory model, the bottleneck specification program 200 works so as to create model data to be stored into the column 4001 by setting the model type 402 to "response time explanatory model".

Figure 9:
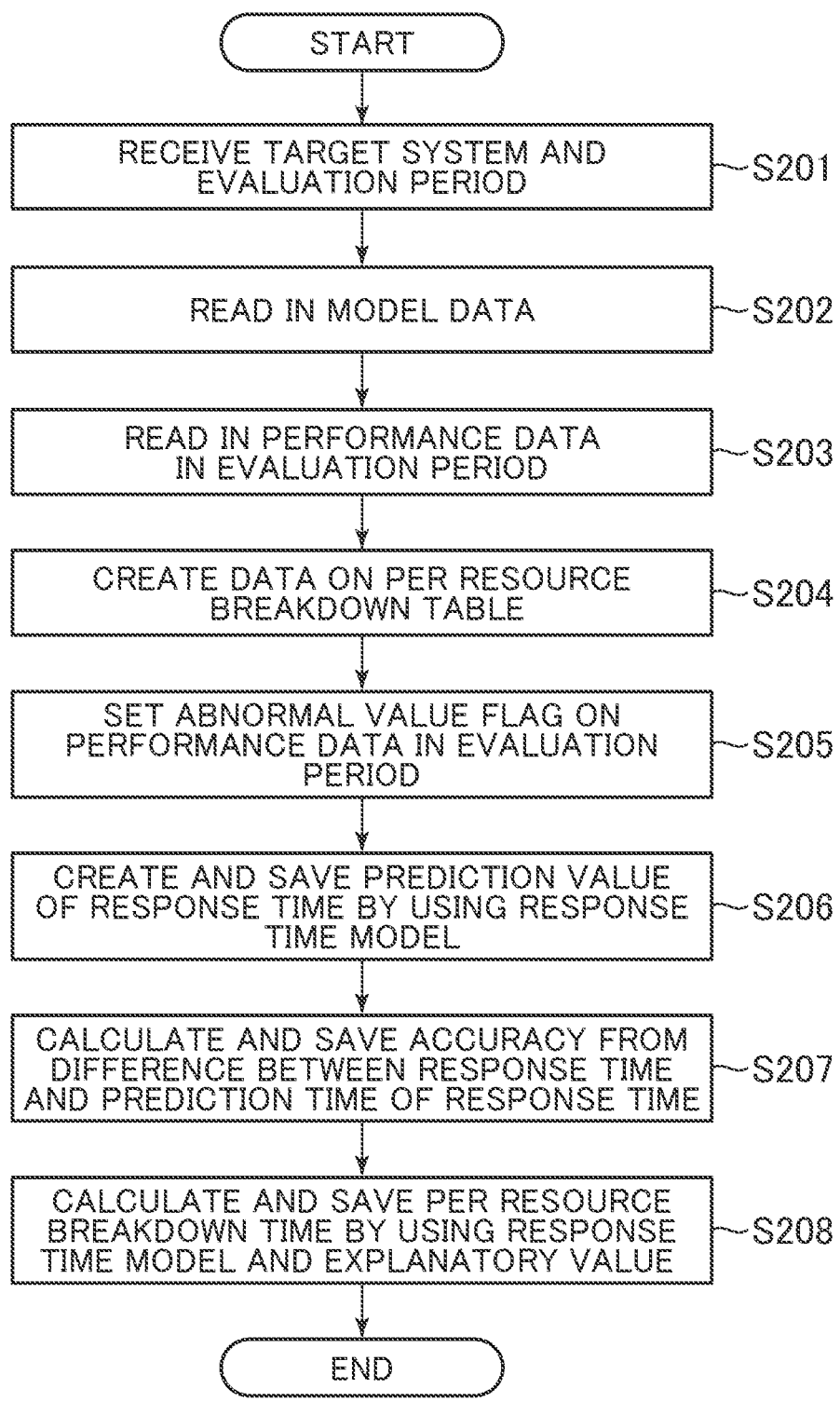
FIG. 9 is a process flowchart illustrating one example of a response-time-based per-resource breakdown estimation process in the first embodiment of the present invention.

FIG. 9 is a process flowchart illustrating one example of a process of performing the response time breakdown calculation (S200) in the first embodiment. In FIG. 9, the bottleneck specification program 200 works so as to execute all the steps.

In FIG. 9, in S201, the bottleneck specification program 200 works so as to receive the analysis target system and the analysis target period. The analysis target system and the analysis target period are designated by the GUI illustrated in FIG. 11 (will be described later).

Next, in S202, the bottleneck specification program 200 works so as to read in the model data from the model table 400. The bottleneck specification program 200 works so as to read in the model data in the column that the system name 401 matches the system name which is received in step S201 and the creation time 403 is the closest to the received evaluation period. Thereby, the bottleneck specification program 200 works so as to obtain the response time model and the explanatory model which corresponds to the response time model.

Next, in S203, the bottleneck specification program 200 works so as to read in analysis target measurement data from the performance value data table 300. The contents to be processed are the same as those in S102 and the data in the column that a measurement time 301 is in the analysis target period which is received in S201.

Next, in S204, the bottleneck specification program 200 works so as to newly create columns for result storage in the per-resource breakdown table 500. The data in the measurement time 301, the system name 302 and the response time 303 in the performance value data table 300 which are read in S203 is stored into newly created columns of the measurement time 501, the system name 502 and the response time 503. Other columns are left blank. Data is stored into the blank columns in later steps.

Next, in step S205, the bottleneck specification program 200 works so as to calculate values of the abnormal value flag 504 on the basis of the response time 503 and to store results of calculation into the corresponding columns. The abnormal value flag 504 is a flag which indicates whether the value in a column concerned of the response time 503 is abnormal. In a case where the value which is stored in the column concerned of the response time 503 is abnormal, "Y" is set in the column concerned of the abnormal value flag 504 and in a case where the value is not abnormal, "N" is set in the column concerned of the abnormal value flag 504. Various methods are conceived of as a method of deciding whether the value is abnormal. For example, a method that in a case where the response time is more than a threshold value, the value is decided to be abnormal may be adopted. As an alternative, a method of detecting an outlier on the basis of a base line, that is, a method that a time pattern of the response time, that is, an average value and a standard deviation of values of the response time in a time zone concerned are calculated from past data and in a case where the response time in the column concerned exceeds "the average value+3×the standard deviation", the value is decided to be abnormal may be adopted. As another alternative, a method that, in the response time, values which are ranked in top 5% of high-order values which are obtained in the designated period are decided as the abnormal values and/or a method that the designated period is divided into sections per hour, and values which are ranked in top 5% in each section are decided as the abnormal values may be adopted.

Then, in S206, the bottleneck specification program 200 works so as to calculate the predicted value of the response time and to store the calculated value into the response time predicted value 505. The bottleneck specification program 200 works so as to input the performance values (304 to 307) of each resource which are acquired in S203 into the response time model which is acquired in S202 and to obtain the predicted value of the response time as the output. This predicted value is stored into the response time predicted value 505.

Next, in step 207, the bottleneck specification program 200 works so as to calculate the accuracy on the basis of a difference (the predictive/actual difference) between the value of the response time 503 which is stored in S204 and the value of the response time predicted value 505 which is calculated in step S206, that is, the values in the same column, that is, between the predicted value and the measured value of the response time and to store the calculated accuracy into the accuracy 506. The accuracy is calculated in such a manner that the smaller the value of the predictive/actual difference is, the larger the value of the accuracy becomes, and the larger the value of the predictive/actual difference is, the smaller the value of the accuracy becomes. This is because it is thought that the model which is higher in accuracy is generated as the predictive/actual difference becomes small and therefore it is thought that the accuracy of the per-resource response time breakdown which will be calculated in the next S208 will become high. Although various methods are conceived for accuracy calculation, for example, in a case where the accuracy which is attained when the predictive/actual difference is zero is about 1.0 and the accuracy which is attained when an absolute value of the predictive/actual difference is more than about 10 ms is about 0.0, and the absolute value of the predictive/actual difference is set between 0 and about 10 ms, the accuracy may be calculated so as to get closer to 0.0 in proportion with the magnitude of the absolute value of the predictive/actual difference. As an alternative, the accuracy may be also calculated as an absolute value of a value which is obtained by dividing the predictive/actual difference by the measured value (zero is excluded).

Then, in S208, the bottleneck specification program works so as to calculate the per-resource response time breakdown and to store the result thereof into the per-resource breakdown table 500. The bottleneck specification program works so as to input the performance values (304 to 307) of each resource which are acquired in S201 into the explanatory model which is acquired in S202 and to obtain respective per-resource response time breakdown values. The bottleneck specification program works so as to store these values into columns of the rows 507 to 510 in the per-resource breakdown table 500.

Outputs from the explanatory model depend on the type of the XAI technology which is used. There are outputs which are output totally as positive values as indicated in the columns of the rows 507 to 510 in FIG. 5 as described above and there are also outputs which are output as positive values and negative values in a mixed state as illustrated in FIG. 12. In FIG. 12, an output table 700 of the explanatory model exhibits an output example that the positive values and the negative values are present in the mixed state and includes per-resource response time breakdown rows 701 to 704. These rows correspond to the rows 507 to 510 in the per-resource breakdown table 500. Values in these rows indicate positive and negative degrees of influence on the average value of values in the columns of the response time 303 in the learning data which is read in the above-mentioned S102. Since the bottlenecked resource exerts positive-value influence on the response time and therefore attention may be paid to the positive-value resource even when the positive values and the negative values are output in the mixed state in this way, there is no problem in processing. However, here, in a case where the positive and negative values which are extremely large in absolute values are present in the mixed state, there is a fear that a model may be generated by adding together the positive and negative values so as to be forcibly fitted to the measured value of the response time. In the model which is generated in this way, even when the predictive/actual difference of the response time is small in the process in S207, it is impossible to rely on the output value of the per-resource response time and it is necessary to give a small accuracy thereto. For example, in a case where, in the output values which are derived from the explanatory model, the positive value that the absolute value exceeds its threshold value and the negative value that the absolute value exceeds its threshold value are present in the mixed state, a method of reducing the accuracy (accuracy 506) to a low value such as, for example, 0.0 is conceived of. Here, the threshold value is, for example, the average value of the response time (response time 303) values in the learning data which is read in S102.

Figure 10:
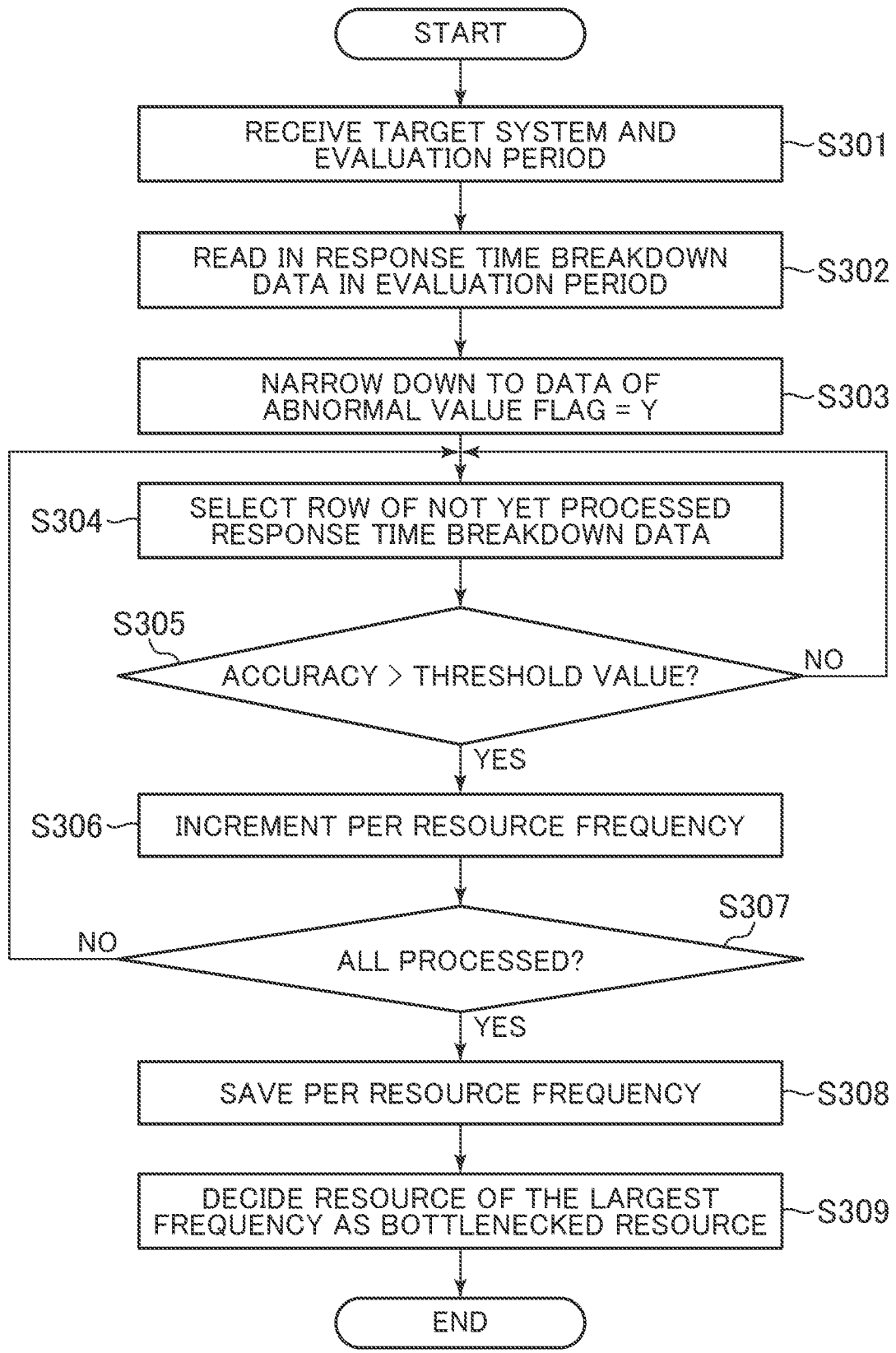
FIG. 10 is a process flowchart illustrating one example of a bottlenecked resource specification process in the first embodiment of the present invention.

FIG. 10 is a process flowchart illustrating one example of the process S300 of specifying the bottlenecked resource in the first embodiment. In the process in FIG. 10, the bottlenecked resource in the designated period is specified on the basis of a result of the per-resource response time breakdown which is created in the process S200.

In FIG. 10, in S301, the bottleneck specification program 200 works so as to receive the analysis target system and a period which is used for evaluation. The system and the period are designated by the GUI which is illustrated in FIG. 11 (will be described later).

Next, in S302, the bottleneck specification program 200 works so as to read in data in the columns which correspond the system and the evaluation period which are received in S301 from the per-resource breakdown table 500. For example, in a case where the analysis target system is "System A" and the evaluation periods are T10 to T20, the data in the columns 5000 to 5002 are read in.

Next, in S303, the bottleneck specification program 200 works so as to narrow the columns that the data is read in S302 down to only the columns that the abnormal value flag 504 indicates "Y". That is, only the times that the values of the response time are worsened in particular are narrowed down as targets for totalization.

Next, in S304, the bottleneck specification program 200 works so as to select one row from rows on which succeeding processes are not performed in the remaining rows.

Next, in S305, the bottleneck specification program 200 works so as to refer to the column concerned of the accuracy 506, to proceed to S306 in a case where the value in that column exceeds the threshold value or to S304 in a case where the value in that column is less than the threshold value and to select the next column, for the purpose of improving the accuracy of bottleneck specification by excluding the values in the columns which are low in accuracy.

Next, in S306, the bottleneck specification program works so as to specify the bottlenecked resource with reference to columns concerned of the per-resource response time breakdown rows (507 to 510) and add the bottlenecking frequency of the resource concerned. As a method of specifying the bottlenecked resource with reference to the columns concerned, for example, a resource which is the largest in the value of the per-resource response time breakdown or resources which are ranked in top 3 may be specified as the bottlenecked resources and/or all resources whose values exceed a certain threshold value may be specified as the bottlenecked resources.

Next, in S307, the bottleneck specification program 200 works so as to decide whether processing of all the rows is completed and to proceed to S308 in a case where processing of all the rows is completed, or to return to S304 in a case where processing of all the rows is not completed and to select the next row.

Next, in S308, the bottleneck specification program 200 works so as to store the number of per resource counts which is totalized up to S307 into the bottleneck totalization table 600. The system name and the period which are designated in S301 are stored into the system name 601 and the period 602. The name of the resource (for example, the CPU usage rate of the host X) which is decided to be bottlenecked is stored into the performance value name 603. The bottlenecking frequency which is counted in S306 is stored into the bottlenecking frequency 604.

Then, in S309, the bottleneck specification program 200 works so as to specify the bottlenecked resource in a designated evaluation period with reference to the totalized value in S308. For example, in the column that the period 602 is the evaluation period which is designated in S301, the resource which is the largest in the value in the bottlenecking frequency 604 is decided as the bottlenecked resource.

FIG. 11 is a diagram illustrating one example of a screen used for transmitting a result of execution of the bottleneck specification process in the first embodiment to the IT system manager. In FIG. 11, the screen is configured by three display parts of upper, middle and lower stages.

In FIG. 11, the upper stage is the display part that the IT system manager designates the analysis target and period. A list of systems which are under management of the management computer 100 is displayed in a system selection 1001 and the IT system manager selects one of the systems which are listed. In addition, the IT system manager selects the period of the measurement data which is used for learning from a learning period selection 1002. The selected learning period is received in S101 in FIG. 8. In addition, the IT system manager selects the period of measurement data which is used for evaluation from an evaluation period selection 1003. The selected evaluation period is received in S201 in FIG. 9. Incidentally, in the first embodiment, although the IT system manager selects the learning period and the evaluation period and thereby execution of the analysis process is started, execution of the analysis process may be periodically started. For example, at a time point that the leaning period is fixed to three months, the evaluation period is fixed to the latest one week and measurement data for one week is arrived, the analysis process may be periodically executed by setting the period to the evaluation period.

The middle stage in FIG. 11 is the display part for displaying summary of a result of analysis in the evaluation period which is selected in the evaluation period selection 1003. A bottlenecked resource summary table 1010 which indicates a result of totalization of the bottlenecked resources which are stored in the bottleneck totalization table 600 is displayed on this display part. In the bottlenecked resource summary table 1010, values which are stored in the performance value name 603 and the bottlenecking frequency 604 in the bottleneck totalization table 600 are displayed on a performance value name 1011 and a bottlenecking frequency 1012 respectively. In addition, increase or decrease of the bottlenecking frequency in a selected evaluation period which is defined on the basis of comparison with the bottlenecking frequency in a previous period is displayed on comparison with a previous period 1013. Thereby, it becomes possible to grasp an increasing trend and/or a decreasing trend of the bottlenecking frequency from the performance value of the resource concerned.

A per-resource breakdown time-series graph 1020 that a result of analysis is graphed in time-series is displayed on the lower stage. In the rows which are stored in the per-resource breakdown table 500, the rows for the designated evaluation period are displayed in the form of a stacked bar graph in FIG. 11. For example, in FIG. 11, values which are stored in columns 5000 to 5002 of the per-resource breakdown table 500 are displayed as graphs (1021 to 1023) in the form that a per-resource breakdown 507 to a per-resource breakdown 510 are vertically stacked. In addition, 1024 denotes a response time graph that values of the response time 503 in the per-resource breakdown table 500 are graphed. 1025 denotes a response time threshold value graph which indicates threshold values which are used for decision of the abnormal value flag 504 in the per-resource breakdown table 500. 1026 denotes performance value names and indicates that each of boxes which configure the bar graph is the performance value of which resource as explanatory notes of the graphs. Incidentally, the reason why the bar graph of a time T11 is indicated by a dotted line in the bar graphs is that the value in the column 5001 of the accuracy 506 which becomes the basis of the time T11 is as low as 0.5 and is not trustworthy data.

In the bar graphs, a rectangle which is hutched with diagonal lines and which corresponds to the time T10 on the bar graph 1021 indicates the resource which is decided as the bottlenecked resource. It becomes possible for the IT system manager to confirm at a glance which resource is the bottlenecked resource by visually confirming the hutched rectangle.

As described above, in the first embodiment, the response time model that the response time of the IT system is set as the objective variable and the performance value of the resource is set as the explanatory variable is generated by using the regression algorithm which makes it possible to handle the nonlinear relation and the explanatory model is generated by inputting the model of the response time and using the XAI technology. In addition, the per-resource response time breakdown is calculated by inputting the performance value of each resource into the explanatory model and the resource which is the largest in the response time breakdown value is decided as the bottlenecked resource. Further, in a case where a difference between the predicted value of the response time which is obtained by inputting the performance value of each resource into the response time model and the measured value of the actual response time is small, the high accuracy is given to the per-resource response time breakdown, the bottlenecking frequency of the resource which is specified as the bottlenecked resource on the basis of the per-resource response time breakdown which is high in accuracy is totalized and thereby the bottlenecked resource in the designated period is specified with high accuracy.

As described above, according to the first invention, a more accurate estimated value of the per-resource breakdown time is provided and thereby it becomes possible to accurately specify the resource which is involved in the increase in the response time of the IT system. That is, it becomes possible to precisely specify the bottlenecked resource.

Second Embodiment

In the second embodiment, a hybrid system that a prior art response time analysis which uses a linear model is combined with the response time analysis which uses the nonlinear model which is described in the first embodiment will be described. That is, in a case where results of analyses which use the linear and nonlinear models respectively are compared with each other and a difference between the both results is small, the linear model is used for evaluation of the IT system concerned, while in a case where the difference is large, the nonlinear model is used as described in the first embodiment. Since generation of the linear model and estimation using the linear model are low in calculation cost and therefore it becomes possible to reduce the total calculation cost by linearly modelling some IT systems.

A system configuration of the second embodiment is the same as the system configuration of the first embodiment which is illustrated in FIG. 2. However, the configuration of the model table 400 is different from the configuration thereof in the first embodiment.

FIG. 13 is a diagram illustrating one configuration example of the model table 400 in the second embodiment. In FIG. 13, the model table 400 in the second embodiment is different from the model table 400 in the first embodiment in that a use 405 which is a row in each column of which use/not-use of the model is indicated is added and columns (4006 to 4008) in which model data on the linear model is stored are added.

In FIG. 13, in a case where a model in a column concerned is used, "Y" is stored into the column concerned of the use 405, and in a case where the model is not used, "N" is stored into the column concerned of the use 405. In FIG. 13, there are three columns that the system name 401 is "System A". That is, there are a column 4000 in which a response time model is stored, a column 4001 in which an explanatory model thereof is stored and a column 4006 in which a response time linear model is stored. In the use 405, "N" is stored in the columns 4000 and 4001 and "Y" is stored in the column 4006. This indicates that the response time linear model in the column 4006 is used as the model for the system A.

Figure 14:
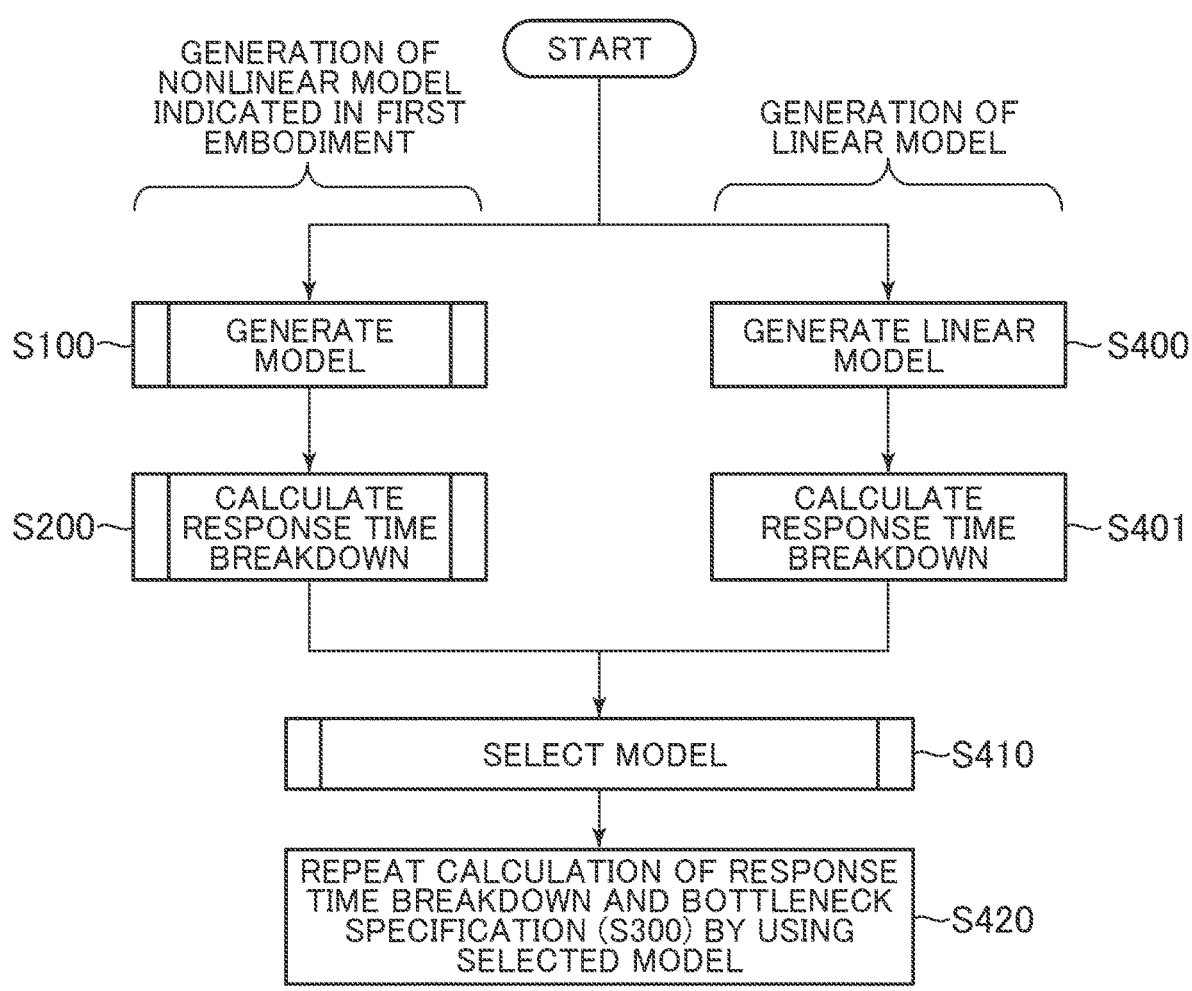
FIG. 14 is a process flowchart illustrating one example of analysis processing in the second embodiment of the present invention.

FIG. 14 is a process flowchart illustrating one example of analysis processing in the second embodiment. The process flow in FIG. 14 is divided into two processes after execution of the analysis processing is started. A left-side branch includes processes (S100, S200) of generating the nonlinear model and calculating the breakdown of the response time, that is, the processes which are described in the first embodiment. A right-side branch includes processes (S400, S401) of generating the linear model and calculating the breakdown of the response time by the linear model.

In FIG. 14, in S400, the bottleneck specification program 200 works so as to perform the process of generating the linear model. This process is almost the same as the process in S100 in the first embodiment. A difference between the process in S400 and the process in S100 is that in S103, the algorithm which is used for model generation is the nonlinear regression algorithm and the process of generating the explanatory model in S104 is not performed.

Next, in S401, the bottleneck specification program 200 works so as to calculate the per-resource response time breakdown by using the linear model which is generated in S400. This process is almost the same as the process in S200 in the first embodiment which is illustrated in FIG. 8. A difference between these processes is that in S208, not the explanatory model but the linear model is used for calculation of the per-resource response time breakdown. That is, the performance value of each resource is multiplied by a coefficient of a corresponding linear model so as to set a multiplied value as the breakdown of the per-resource response time of each resource.

Next, after completion of execution of the both processes which are branched in this way, which model is adopted is decided in S410 for model selection. Details of this process are illustrated in FIG. 15.

Figure 15:
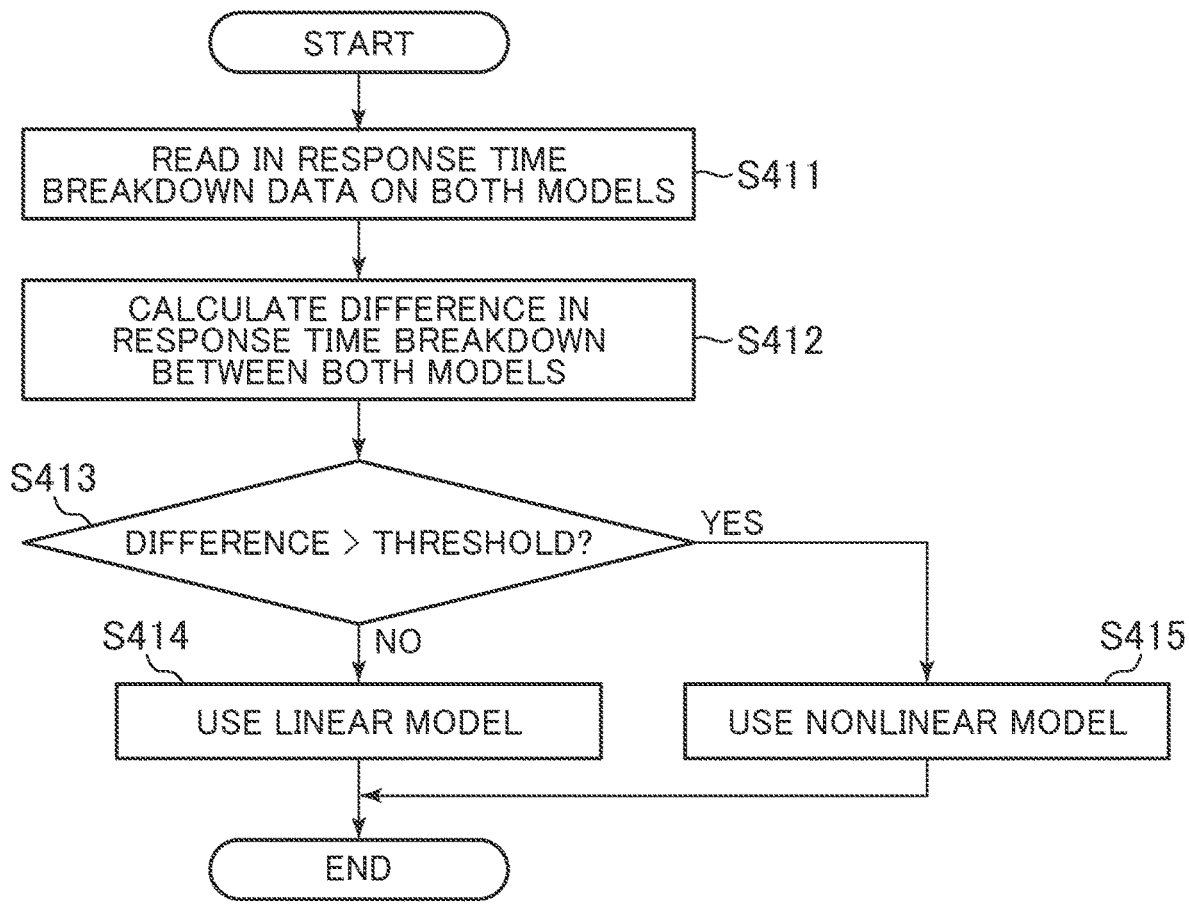
FIG. 15 is a process flowchart illustrating one example of a model selection process in the second embodiment of the present invention.

FIG. 15 is a process flowchart illustrating one example of a model selection process in the second embodiment. In FIG. 15, in S411, the bottleneck specification program 200 works so as to acquire per-resource response time breakdowns that the explanatory models of the linear model and the nonlinear model generate respectively, that is, the values in the rows 507 to 510 in the per-resource breakdown table 500.

Next, in S412, the bottleneck specification program 200 works so as to calculate a difference between the per-resource response time breakdown data which are obtained by using the linear and nonlinear models. The bottleneck specification program 200 works so as to calculate each difference between values in each of the rows 507 to 510 which are generated by using the linear model and the nonlinear model. As a difference calculation method, for example, a root-mean-square error calculation method or another method may be used.

Next, in S413, the bottleneck specification program 200 works so as to check to see whether the difference which is calculated in S412 exceeds the threshold value concerned. In a case where the difference is less than the threshold value, the process proceeds to S414. In a case where the difference is more than the threshold value, the process proceeds to S415.

Next, in S414, the bottleneck specification program 200 works so as to select use of the linear model for the target IT system. That is, in the use 405 in the model table 400, "Y" is set in the column of the model concerned and "N" is set in the column of the nonlinear model.

Then, in S415, the bottleneck specification program 200 works so as to select use of the nonlinear model for the target IT system. In this process, in contrast to S414, in the "use" 405 in the model table 400, "Y" is set in the column of the nonlinear model and "N" is set in the column of the linear model.

In S420 in FIG. 14, thereafter, the process of calculating the per-resource response time breakdown and the bottleneck specification process S300 are repeatedly performed on the newly arrived performance data by using the model which is selected in S410.

As described above, according to the second embodiment, it becomes possible to specify the resource which is involved in the increase in response time of the IT system at a lower calculation cost.

Although the embodiments of the present invention are described above, the present invention is not limited to the above-described embodiments. For example, although in the above-described embodiments, description is made by using the response time as the overall performance value, the number of requests which are left as they are, the batch completion time and so forth may be used. In addition, the above embodiments are described in detail for easy understanding of the present invention and are not necessarily limited to those which include all the configurations which are described. In addition, it is also possible to replace part of one configuration of one embodiment with a configuration of another embodiment and it is also possible to add one configuration of another embodiment to one configuration of one embodiment. In addition, it is possible to add, delete and/or replace another configuration of each embodiment to, from and/or with part of one configuration of each embodiment.

What is claimed is:

1. A performance analysis apparatus for use in a performance analysis of an IT system comprising:
   a processing device;
   a storage device; and
   an input/output interface, wherein
   the processing device
   creates an overall performance prediction model by using
      a nonlinear regression algorithm with an overall performance value which is input via the input/output interface and which is measured from the IT system being set as an objective variable and with a first resource performance value which is measured simultaneously with measurement of the overall performance value and which is a value of a resource which configures the IT system being set as an explanatory variable, creates an explanatory model by inputting the overall performance prediction model and using an XAI (Explainable Artificial Intelligence) technology, and calculates a degree of per-resource influence on the overall performance value which is output by inputting a second resource performance value which is measured at a time which is different from the time that the first resource performance value of the resource is measured into the explanatory model.

2. The performance analysis apparatus according to claim 1, wherein
the overall performance value is a response time of the IT system.

3. The performance analysis apparatus according to claim 2, wherein
the IT system is a storage system, and the overall performance value is an I/O response time of an I/O request to the storage system or the number of the I/O requests which are left unanswered.

4. The performance analysis apparatus according to claim 1, wherein
the processing device decides resources as bottlenecked resources in descending order of degrees of influence of the resources on the overall performance value which is measured.

5. The performance analysis apparatus according to claim 4, wherein
the processing device includes an evaluation period acceptance unit and totalizes the frequency that the resource concerned is decided as the bottlenecked resource in the evaluation period per resource and decides the resource which is the largest in the number of times as the bottlenecked resource in the evaluation period.

6. The performance analysis apparatus according to claim 5, wherein
the processing device sets only a time at which the overall performance value is particularly decreased in the evaluation period as a target for totalization and thereby performs a process of totalizing the bottlenecking frequency per resource.

7. The performance analysis apparatus according to claim 4, wherein
the processing device gives accuracy which is set higher as a predicted-actual difference which is a difference between a predictive value of the overall performance value which is calculated by inputting the second resource performance value of the resource into the overall performance prediction model and an actually measured value of the overall performance value which is measured simultaneously with measurement of the second resource performance value becomes smaller to the per-resource degree of influence on the overall performance value and gives the accuracy which is set lower as the predicted-actual difference becomes larger to the degree of influence.

8. The performance analysis apparatus according to claim 7, wherein
the processing device performs the process of totalizing the bottlenecking frequency per resource by excluding a time at which the accuracy is low.

9. The performance analysis apparatus according to claim 5, wherein
in a value of the per-resource degree of influence on the overall performance value, in a case where a positive value that an absolute value of the degree of influence exceeds a threshold value and a negative value that the threshold value exceeds the absolute value are present in a mixed state, the processing device gives a low accuracy to the per-resource degree of influence on the overall performance value.

10. The performance analysis apparatus according to claim 9, wherein
the threshold value which is set for the absolute value is an average value of the overall performance values which are measured simultaneously with measurement of the second resource performance values.

11. The performance analysis apparatus according to claim 1, wherein
the processing device further includes an overall performance linear prediction model which is created by using a linear regression algorithm with a first resource performance value which is measured simultaneously with measurement of the overall performance value and which is the value of the resource which configures the IT system being set as the explanatory variable, and
in a case where a difference between the degree of influence on the overall performance value which is calculated by using the overall performance linear prediction model and the degree of influence on the overall performance value which is calculated by using the explanatory model is small, adopts the overall performance linear prediction model as the model.

12. A performance analysis method comprising:
creating an overall performance prediction model by using a nonlinear regression algorithm with an overall performance value which is input via an input/output interface and which is measured from an IT system being set as an objective variable and with a first resource performance value which is measured simultaneously with measurement of the overall performance value and which is a value of a resource which configures the IT system being set as an explanatory variable;
creating an explanatory model by inputting the overall performance prediction model and using an XAI (Explainable Artificial Intelligence) technology; and
calculating a degree of per-resource influence on the overall performance value which is output by inputting a second resource performance value which is measured at a time which is different from the time that the first resource performance value of the resource is measured into the explanatory model.

* * * * *